UNITED STATES PATENT OFFICE.

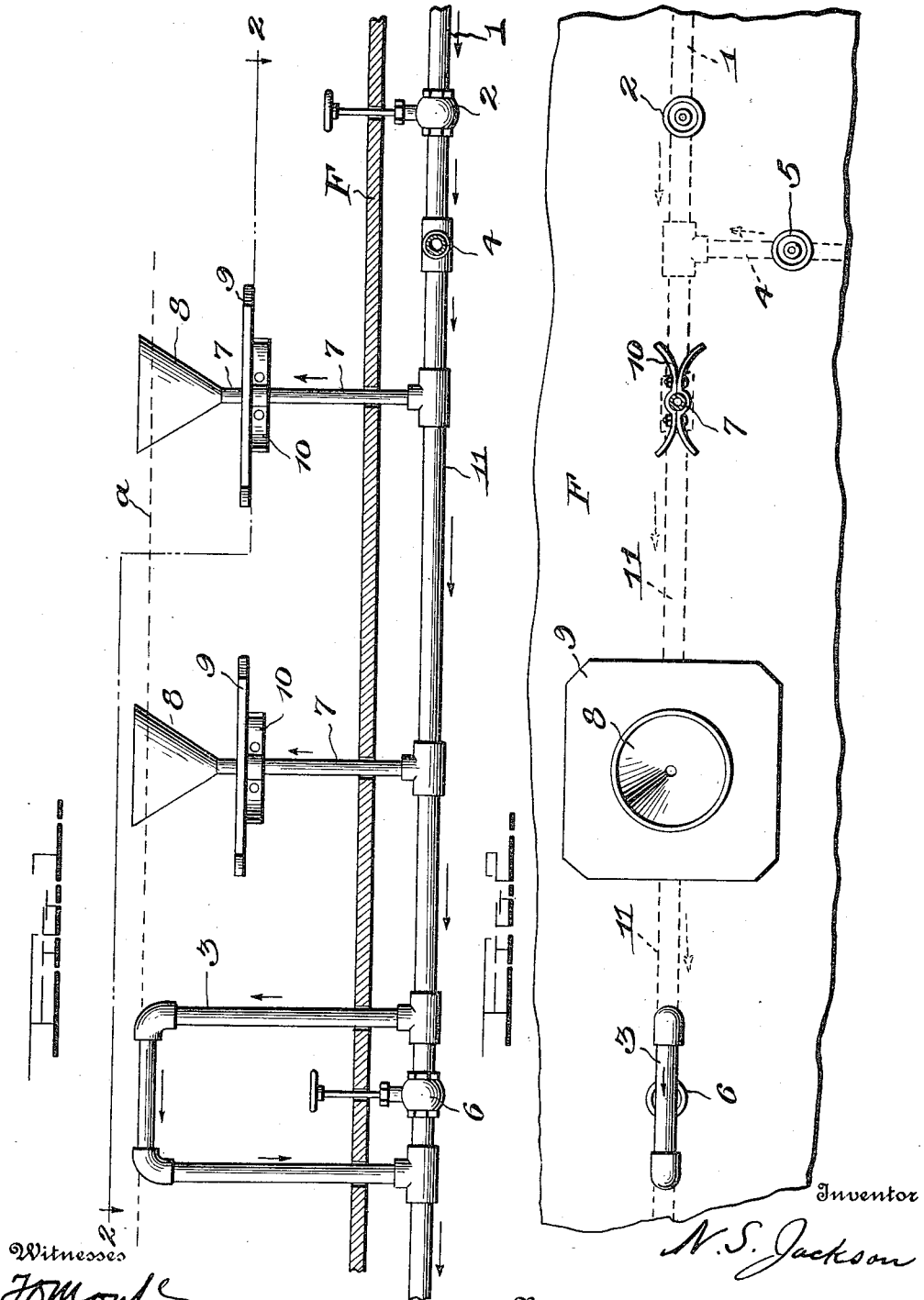

NEPHI S. JACKSON, OF TECOMA, NEVADA.

DEVICE FOR WATERING POULTRY.

1,148,778.  Specification of Letters Patent.  Patented Aug. 3, 1915.

Application filed May 22, 1914. Serial No. 840,320.

*To all whom it may concern:*

Be it known that I, NEPHI S. JACKSON, a citizen of the United States, residing at Tecoma, in the county of Elko and State of Nevada, have invented a new and useful Device for Watering Poultry, of which the following is a specification.

The object of my invention is to provide a device especially adapted for watering poultry, so arranged that any number of cups may be constantly supplied with running water, so that the water may always be fresh; to provide a device with all cups positioned or disposed in a substantially elevated position to obviate the scratching of litter into the cups; and to provide novel means for affording the poultry access to the elevated cups.

It is an especial object of my invention to provide a device or system in which a running supply of water may be maintained at all times and regardless of weather conditions, whereby to obviate the inconvenience and danger of having lamps for heating poultry fountains in winter as has heretofore been a common method of preventing freezing of water in cups.

It is also an object of my device for watering poultry to provide a construction that will force the poultry to exercise when confined in houses.

It is an incidental object of my invention to dispose of my main pipes beneath the ground or flooring of poultry houses so as not to take up floor space.

It is a further object of my invention to provide means for maintaining the water in the cups at a uniform level at all times.

It is an especial object of my invention to provide a system of poultry watering fountains which may be disposed at widely separated locations in different poultry houses, and kept constantly supplied with running warmed water in cold temperatures, and having means operatively connected with such separated fountains to require flight of the poultry to gain access to the fountains, thus requiring constant exercise by the poultry and maintaining the fountains in clean condition.

It is an especial object of my invention to provide such a system which will work as well with 100 cups as with a limited number. This object has been attained in my own poultry plant, where the system has worked successfully with twenty-eight cups, and throughout the coldest seasons of the year.

I attain these objects by the mechanism illustrated in the accompanying drawings, in which—

Figure 1 is a side elevation of my device, with member 4 in section; Fig. 2 is a top plan view of my device, partly in section, on line 2—2 of Fig. 1.

Like characters of reference indicate like parts throughout the views.

My device for watering poultry comprises a plurality of elevated cups 8 supported substantially above the ground or flooring, indicated by F, (at a distance preferably of about two feet); an elevated platform 9 supported by suitable means, preferably clamps 10 secured to conduits 7 as illustrated, the platforms being positioned relatively near the cups (preferably 9 inches below the top of the cups) to afford the poultry access thereto; conduits 7 which terminate in cups 8; and means for supplying running water to the cups; and means for maintaining the water in the cups at an approximately uniform or predetermined temperature.

Means for supplying water to the cups is provided, consisting of a conduit 11 of relatively larger size than conduits 7; a vertically-disposed inverted-U shaped conduit opening out of conduit 11 at a point beyond the various conduits 7, and a valve 6 whereby the portion of conduit 11 between the arms of the inverted U-shaped conduit 3 may be obstructed and water directed through conduit 3. The topmost portion of conduit 3 is positioned slightly below the level of the top of cups 8, as indicated by dotted line $a$ in Fig. 1, to maintain the water in the cups at a uniform level.

Means for supplying and controlling the supply of running water to the cups 8, conduits 7 and conduit 11 and for regulating its temperature is provided, consisting of a cold-water conduit 1, provided with a valve 2 for the regulation of the supply of water therethrough, and a hot-water conduit 4, provided with a valve 5 for the regulation of the supply of hot water therethrough, both of the said conduits 1 and 4 opening into or terminating in conduit 11, and connected therewith in a suitable manner.

The operation of my device is indicated by the arrows in connection with the accompanying illustrations, a regulated supply of running hot and cold water being allowed to flow through conduits 4 and 1 respectively into conduit 11, till it reaches valve 6, which when closed forces the water to flow through the inverted U-shaped conduit 3 and at the same time flow into conduits 7—of which there may be any desired number—into cups 8.

In order that the poultry may have access to the water in the cups and for the additional purpose of forcing the poultry to take needed exercise when confined elevated platforms mounted on conduits 7 and supported by clamps 10 secured to the conduits are provided.

Preferably I dispose conduit 11 beneath the ground or flooring, to avoid taking up floor space and provide a more sanitary device.

The provision of elevated cups is of distinct advantage in preventing the poultry from scratching litter into the water.

It is an important feature of my invention to maintain the water in the series of cups at a uniform or predetermined temperature under all weather conditions by having conduits 4 and 1 operatively connected with sources of running water (not illustrated). The water is thus kept fresh and kept at a uniform temperature in winter.

Conduit 11 is of relatively larger diameter than conduits 7, to permit of flushing out the main pipe in case of any obstruction entering through conduits 7.

The various conduits are threaded in the usual manner to provide means for operatively connecting the various members.

What I claim is:

1. In a poultry watering device, a main supply pipe, a vertical water supply pipe opening out of said main pipe, a drinking cup in which said vertical pipe terminates, a platform surrounding the pipe and positioned at such height as to require flight of the poultry for supporting poultry drinking from the trough, and means for supporting the platform on the pipe, said means consisting of opposite clamp members having reversely bent ends to support the platform.

2. In a poultry watering system, a multiplicity of vertical water supply pipes successively dependent on and tributary to a common water supply means, a common water supply means adapted to convey running water continuously at a predetermined pressure to the successive vertical water supply pipes tributary thereto, each of said vertical water supply pipes terminating in a poultry drinking cup, and each of said pipes having a poultry-supporting platform surrounding the pipe and positioned at such height as to afford access by the poultry to the cups and to require flight to obtain access to the cups, and having means for supporting the platforms, comprising clamping members engaging about the pipe and having laterally projecting ends to support the platform, as set forth and for the purposes described.

In testimony whereof, I hereunto affix my signature, in the presence of two witnesses.

NEPHI S. JACKSON.

Witnesses:
B. H. SHARTLE,
S. B. JOHNSON.

Copies of this patent may be obtained for five cents each, by addressing the "Commissioner of Patents, Washington, D. C."